Dec. 14, 1937.  H. E. HODGSON  2,102,318
ELECTROMAGNETIC CLUTCH
Filed Nov. 29, 1935  2 Sheets-Sheet 1

Inventor
Howard E. Hodgson
By Frank H. Hubbard
Attorney

Dec. 14, 1937.  H. E. HODGSON  2,102,318
ELECTROMAGNETIC CLUTCH
Filed Nov. 29, 1935  2 Sheets—Sheet 2
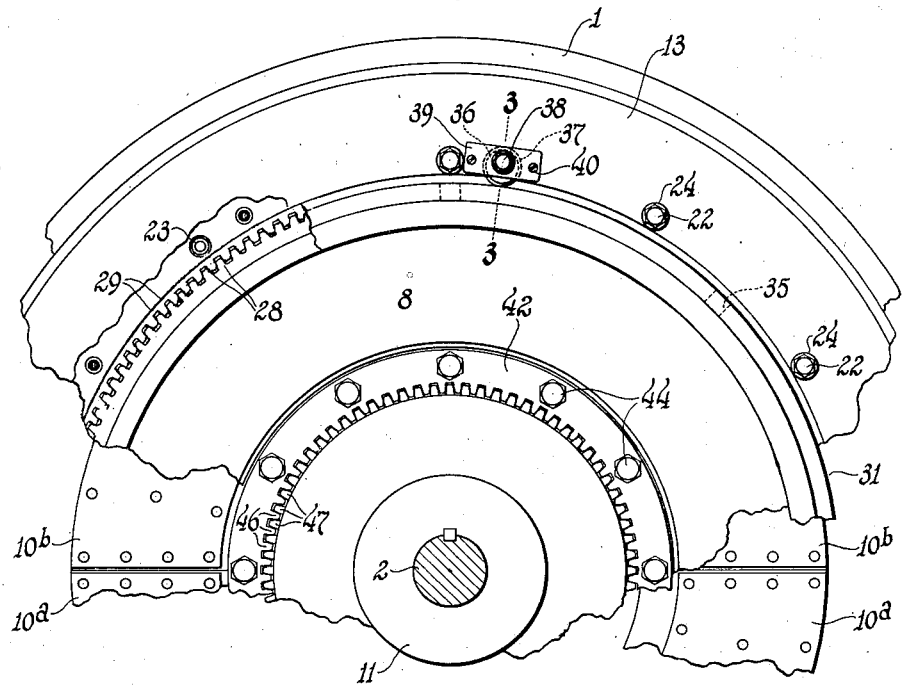
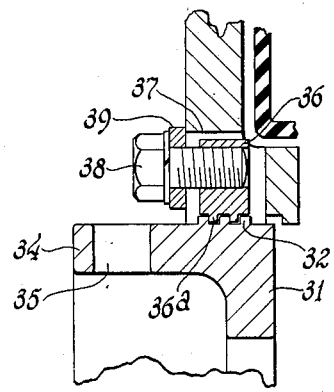
Inventor
Howard E. Hodgson
By Frank H. Hubbard
Attorney Patented Dec. 14, 1937

2,102,318

UNITED STATES PATENT OFFICE 2,102,318

ELECTROMAGNETIC CLUTCH

Howard E. Hodgson, Wauwatosa, Wis., assignor to Cutler-Hammer, Inc., Milwaukee, Wis., a corporation of Delaware Application November 29, 1935, Serial No. 52,107

6 Claims. (Cl. 192—84)

This invention relates to electromagnetic clutches, and while not limited thereto is particularly applicable to clutches for flywheel drives such as are employed in power presses.

The present invention has among its objects to provide an improved electromagnetic clutch having its driving parts designed and arranged to provide a relatively large flywheel effect in proportion to the weight thereof and having a driven element of relatively small inertia.

Another object is to provide a clutch of the aforesaid character having its parts arranged to facilitate rapid dissipation of the heat generated in the operating winding and also by its friction surfaces.

Another object is to provide a clutch of the aforesaid character having its parts constructed and arranged to provide for ready adjustment of the friction parts and to also facilitate removal of the driven element for inspection or repair.

Various other objects and advantages of the invention will hereinafter appear.

The accompanying drawings illustrate an embodiment of the invention which will now be described, it being understood that various modifications may be made in the embodiment illustrated without departing from the spirit and scope of the appended claims.

In the drawings,

Fig. 2 is a fragmentary end view of the clutch shown in Fig. 1; and

Fig. 3 is a fragmentary sectional view taken substantially on lines 3—3 of Fig. 2.

Figure 1:
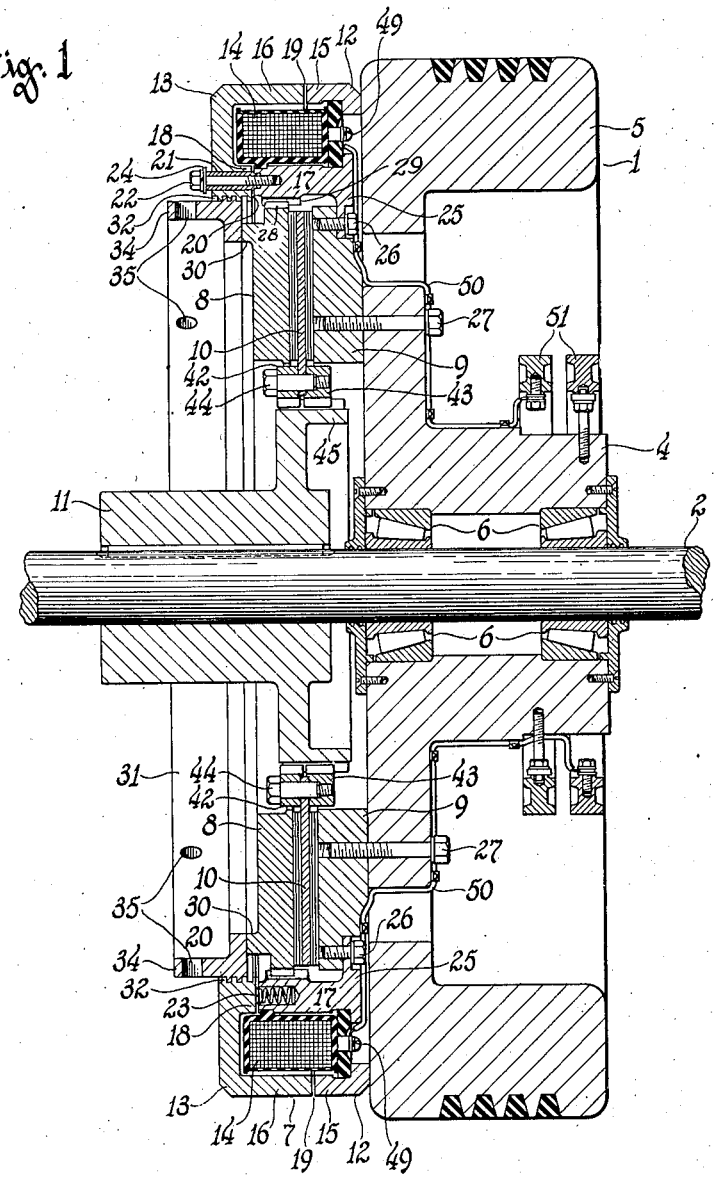
Figure 1 is a vertical sectional view of a clutch embodying the invention.

The clutch illustrated in the drawings is associated with a flywheel 1 rotatably mounted upon a shaft 2, the flywheel shown having a projecting hub portion 4 and a projecting rim portion 5 on one side thereof and being supported upon said shaft by roller bearings 6. Said clutch includes a driving element consisting of a magnet 7 mounted upon the left hand face of flywheel 1 and having a pair of friction rings 8 and 9 associated therewith and a driven friction ring 10 arranged between the former friction rings and mounted upon a hub 11 fixed to shaft 2.

More specifically magnet 7 is of annular form and includes a field member 12, an armature member 13 and a magnet winding 14 wound upon an insulating bobbin carried by said field member. Field member 12 and armature member 13 are provided with annular pole projections 15 and 16, respectively, which surround the winding 14, and annular pole projections 17 and 18, respectively, which are located within said winding. The pole projections 15 and 16 have cooperating pole faces 19 located adjacent the right hand end of winding 14 and the pole projections 17 and 18 have cooperating pole faces 20 located adjacent the left hand end of said winding.

Armature member 13 is provided with openings for receiving a plurality of spaced bushings 21 which are secured to the face of pole projection 17 on field member 12 by cap screws 22, and said armature member is slidable axially upon said bushings and is biased to move away from said field member by a plurality of springs 23. The springs 23 are held within openings in pole projection 17 and bear against the face of pole projection 18 on armature member 13, and movement of said armature member under the action of said springs is limited by washers 24 which are secured to the outer ends of the bushings 21 by the cap screws 22.

Field member 12 is provided with an inwardly projecting flange 25 which is secured to friction ring 9 by screws 26 and said friction ring is shouldered to fit within the flange 25 and is secured to the left hand face of flywheel 1 by screws 27. Friction ring 8 is slidably mounted within the pole projection 17 on field member 12 and as shown in Fig. 2 the same is held against rotation with respect to said field member by gear teeth 28 on the periphery thereof which mesh with gear teeth 29 on the interior of pole projection 17. The left hand face of friction ring 8 is provided with an annular projection 30 which abuts a thrust ring 31 mounted upon the armature member 13. Thus upon attraction of armature member 13 friction ring 8 is moved towards the right by thrust ring 31 to clamp friction ring 10 between the same and friction ring 9 to thereby establish a driving connection from flywheel 1 to shaft 2.

To insure proper clamping of the friction rings and to also provide for quick release of the clutch it is necessary to adjust friction ring 8 with respect to the armature member 13 so as to maintain an air gap between the associated pole faces of the magnet upon energization of the magnet. For this purpose thrust ring 31 has a square thread 32 on the periphery thereof and armature member 13 is internally threaded to receive the same. To facilitate adjustment of thrust ring 31 the same is provided with an annular projection 34 which extends beyond the armature member 13 and is provided with openings 35 for receiving a suitable adjusting tool.

Means is provided for holding the thrust ring 31 in adjusted position within the armature member 13, such means comprising a circular locking member 36 mounted within a circular recess 37 in the face of armature member 13. As shown in Fig. 3 locking member 36 has teeth 36ᵃ on one side thereof which engage with the threads 32 on thrust ring 31 and the same has a tapped opening therein for receiving a cap screw 38 passing through a plate 39 fixed to the face of armature member 13 by screws 40. Cap screw 38 is offset with respect to the axis of locking member 36 to prevent turning of said locking member within the recess 37 and said locking member is spaced with respect to plate 37. It is thus apparent that locking member 36 can be drawn towards the left with respect to armature member 13 by the screw 38 to securely lock the thrust ring 31 against turning within said armature member.

As hereinbefore stated, the driven friction ring 10 is mounted upon a hub 9 fixed to shaft 2. Friction ring 10 has friction linings secured to opposite faces thereof and as shown in Fig. 2 the same consists of two sections 10ᵃ and 10ᵇ which are clamped between a pair of ring members 42 and 43 by screws 44. The ring members 42 and 43 are slidably mounted upon the periphery of an outwardly projecting flange 45 on hub 11 and as shown in Fig. 2 said ring members are held against rotation with respect to hub 11 by gear teeth 46 on the inner surfaces thereof which mesh with gear teeth 47 on the periphery of said flange.

The magnet winding is provided with suitable terminals 49 which are located within openings in the field member 12 and said terminals are connected by leads 50 to a pair of insulated slip rings 51 mounted on hub 4.

With the parts arranged as hereinbefore described it is apparent that upon energization of winding 14, armature member 13 is attracted toward field member 12 and the thrust ring 31 associated with said armature member then acts to force friction ring 8 toward the right, whereby the driven friction ring 10 is clamped between friction rings 8 and 9 to establish a driving connection between flywheel 1 and the driven shaft 2. Upon de-energization of winding 14, armature member 13 is moved out of its attracted position under the action of springs 23 and friction ring 8 is thus released to interrupt the driving connection between flywheel 1 and shaft 2.

Numerous advantages are obtained by arranging the clutch parts in the manner above described. A large flywheel effect is obtained by arranging the field and armature members outside the friction rings. Also the weight of the driven element of the clutch is reduced to a minimum so that a minimum of power will be required for acceleration of said member when the clutch is engaged. It should also be noted that the thrust ring 31 and friction ring 8 can be removed without disturbing the other parts of the clutch to render the driven friction ring 10 accessible for inspection or repair and if it is necessary the two sections 10ᵃ and 10ᵇ of said ring can be detached by removing the screws 44.

What I claim as new and desire to secure by Letters Patent is:

1. In an electromagnetic clutch, in combination, a driving element having cooperating field and armature members of annular form, a pair of friction elements mounted within the opening in said field member, one of said friction elements being fixed to said field member and the other being coupled directly to said field member to rotate therewith and being movable toward said former friction element by said armature member upon attraction of the latter and a driven friction element to be clamped between said pair of friction elements upon attraction of said armature member.

2. In an electromagnetic clutch, in combination, a driving element having cooperating field and armature members of annular form, a pair of friction rings mounted within the opening in said field member, one of said friction rings being fixed to said field member and the other being coupled to said field member independently of said armature member and being movable axially with respect to said field member, an adjustable thrust part associated with said armature member for engaging said latter friction ring to move the same toward said former friction ring upon attraction of said armature member and a driven friction ring to be clamped between said pair of friction rings upon attraction of said armature member.

3. In an electromagnetic clutch, in combination, a driving element including an annular field member having teeth on the inner surface thereof and a cooperating annular armature member nonrotatably mounted upon said field member and movable axially with respect thereto, a pair of driving friction rings mounted within said field member, one of said friction rings being fixed to said field member and the other being movable axially within said field member and having teeth on the periphery thereof which mesh with the teeth on the interior of said field member, a thrust ring adjustably mounted within said armature member for engaging said latter friction ring to move the same towards said former friction ring upon attraction of said armature member, and a driven friction ring arranged between said former friction rings to be clamped thereby upon attraction of said armature member.

4. In an electromagnetic clutch, in combination, a shaft, a driving flywheel rotatably mounted thereon, a magnet of annular form mounted upon said flywheel, said magnet including a field member fixed to said flywheel and a cooperating armature member mounted to rotate with said field member and movable axially with respect thereto, a pair of driving friction rings mounted within said field member, one of said friction rings being fixed to said field member and the other being coupled to said field member independently of said armature member and being movable axially with respect to said field member, an adjustable thrust part mounted upon said armature member for engaging said latter friction ring to move the same toward said former friction ring upon attraction of said armature member and a driven friction ring to be clamped between said pair of friction rings upon attraction of said armature member, said driven friction ring being movable axially upon said shaft and being fixed against rotation with respect thereto.

5. In an electromagnetic clutch, in combination, a shaft, a driving flywheel rotatably mounted thereon, a magnet of annular form mounted upon said flywheel, said magnet including a field member fixed to said flywheel and a cooperating armature member mounted to rotate with said field member and to move axially with respect thereto, a pair of driving friction rings mounted within said field member to rotate therewith, one of said friction rings being fixed to said field member and the other being coupled to said field member independently of said armature member and being movable axially with respect to said field member, an adjustable thrust part mounted upon said field member for engaging said latter friction ring to move the same toward said former friction ring upon attraction of said armature member, a driven ring element including a plurality of removable segments to be clamped between said pair of friction rings upon attraction of said armature member, said ring element having teeth on the interior thereof and a hub fixed to said shaft for supporting said driven ring element, said hub having teeth on the periphery thereof to mesh with the teeth on the interior of said driven ring element.

6. In an electromagnetic clutch, in combination, a shaft, a driving flywheel rotatably mounted thereon, a magnet of annular form mounted upon said flywheel, said magnet including a field member fixed to said flywheel and a cooperating armature member mounted to rotate with said field member and movable axially with respect thereto, a pair of driving friction rings mounted within said field member to rotate therewith, one of said friction rings being fixed to said field member and the other being movable axially with respect thereto, an adjustable thrust part mounted upon said armature member for engaging said latter friction ring to move the same towards said former friction ring upon attraction of said armature member, a driven friction ring comprising a plurality of segments to be clamped between said former friction rings upon attraction of said armature member, a hub fixed to said shaft for supporting said driven friction ring, said hub having teeth on the periphery thereof and a pair of supporting rings secured to opposite sides of said segments to hold the same in assembled relation, said supporting rings having teeth on the interior thereof meshing with the teeth on said hub.

HOWARD E. HODGSON.